UNITED STATES PATENT OFFICE.

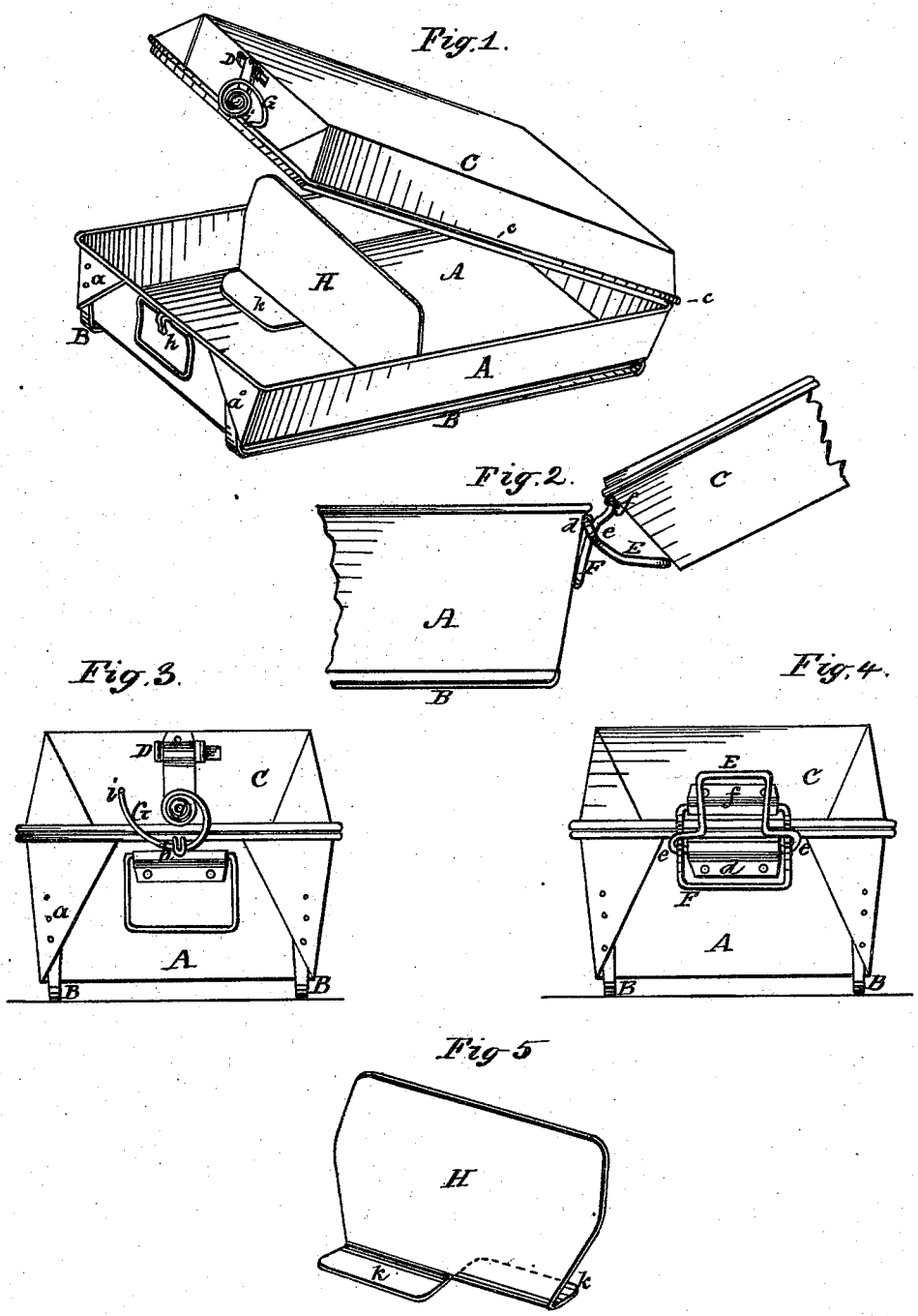

BRADFORD P. FOSTER, OF VINELAND, NEW JERSEY.

IMPROVEMENT IN BAKING-PANS.

Specification forming part of Letters Patent No. 174,222, dated February 29, 1876; application filed February 9, 1876.

*To all whom it may concern:*

Be it known that I, BRADFORD P. FOSTER, of Vineland, in the county of Cumberland and State of New Jersey, have invented certain new and useful Improvements in Baking-Pans; and that the following is a full, clear, and exact description of the invention, reference being had to the accompanying drawings, making a part of this specification, in which—

Figure 1 represents the baking-pans in perspective. Fig. 2 represents a portion of the pans in side view, showing the hinged connection formed by the linking of the handles. Fig. 3 represents the baking-pans in end view and the spring-fastening. Fig. 4 represents the end view of the baking-pans on which the handles that form the hinge are attached. Fig. 5 represents, in perspective, one of the division-plates used with the baking-pans.

Similar letters of reference, where they occur, denote like parts in all the figures.

My invention relates to baking-pans in which bread, meat, and other articles of food can be cooked with less danger of burning than in common baking-pans, by means of runners located under the lower pan that keep it from the floor of the oven, and also by means of a tight-fitting joint between the two pans, thus keeping the steam or aroma within the baking-pans. My invention relates, also, to the hinged connection between the two baking-pans, which consists in forming peculiar bends on the wire handles of each pan, so that one handle can enter the other, and form with it a substantial hinge for one end of the pans, allowing one to rotate on the other, and at the same time serving as a support for the upper pan when it is lifted off the lower one, and also allowing the baking-pans to be separated easily when desired. My invention relates, also, to division-plates formed of a single piece of sheet metal and bent in such manner as to conveniently stand on the bottom of the lower pan and divide it into compartments so as to separate the loaves of bread or other articles from each other.

To enable others skilled in the art to make and use my invention, I will proceed to describe the same with reference to the drawings.

A represents the lower baking-pan, made of sheet metal in the ordinary manner, and to which is attached at each end, by rivets or indentations, as at $a$, the extremities of two wires, B, that serve as runners or supports for the pan, and prevent the articles in the pan from burning on the bottom while baking, and prevent the pan from wearing out. At the same time the runners B allow the pan to be moved in and out of the oven with the greatest convenience. C represents the upper pan or cover. It is provided with a wire, $c$, running around it, a short distance above its lower edge, to prevent it from entering too far into the lower pan, and yet form a tight joint with the latter. It is also furnished with a ventilator that can be opened or closed when baking by means of a slide, D.

The two pans A and C are held together in the following manner: To the rear of the pan A, as shown in Fig. 4, is attached, by means of the strap $d$, the handle E, which is so bent as to form a loop, $e$, on each side of the strap $d$; then it is again bent outward, so as to form the handle E of the pan, and by which it can be lifted. The upper pan, C, has also a handle, F, fastened to its rear end by a strap, $f$. This handle is bent outward, so as to pass over the binding-wires of the pans and through the loops $e$ of the handle E of the lower pan, and then bent outward again, so as to form a firm connection with said loops when the pans are closed, or when they are open, as in Fig. 2, where each handle forms a support for the upper pan or cover C, and although the two pans are firmly connected in the positions shown in Figs. 2 and 4, they can be easily disconnected when the two pans are held at right angles to each other. While the rear end of the pans is held firmly closed by the interlocking of the handles, the front ends of the two pans are united by a wire spiral spring, G, bent in the form of a volute, having one end wound up around a rivet, $g$, fastened to the pan C, and so located as to engage with a hook, $h$, attached to the pan A. The free end $i$ of the spring G is bent outward, so as to form a handle by which it can be operated, the peculiar form of the spring forming a strong, and yet an elastic, connection between the two pans.

It is often desired to bake two or more loaves of bread in the same pan, and for this purpose I employ the partitions H, made of sheet metal, bent each way from the center, as at k k, at right angles with the main partition, so that it will stand up in the pan in any location that may be desired.

It is evident that the baking-pans could be made of the same form out of cast-iron without departing from the spirit of my invention.

Having thus fully described the construction and operation of the baking-pans, I claim as my invention—

1. In combination with the pans A and C, used for baking, the runners B, placed lengthwise of the pans, and constructed substantially as and for the purposes described.

2. In combination with the pans A and C, the hinged connection formed between the two by the interlocking of the handles E and F, substantially in the manner shown and described.

3. In combination with the pans A and C, the partition H and spiral spring G, arranged and operating substantially as described.

4. In combination with the pans A and C, hinged by means of the interlocked handles E and F, the wire c, located on the upper pan C, as and for the purpose described.

BRADFORD P. FOSTER.

Witnesses:
 HOSEA ALLEN,
 LYDIA C. ALLEN.